FIG.1

Aug. 23, 1960    E. L. ARMSTRONG ET AL    2,950,249
GREASE-MAKING PROCESS INVOLVING MECHANICAL ATOMIZATION
Filed Sept. 13, 1957    5 Sheets-Sheet 2

INVENTOR.
ELDON L. ARMSTRONG
WILLIAM R. MARSHALL, JR.,
BY GEORGE W. MURRAY, JR,
HENRY RAICH.

Robert D. Flynn
AGENT

Aug. 23, 1960　　　E. L. ARMSTRONG ET AL　　　2,950,249
GREASE-MAKING PROCESS INVOLVING MECHANICAL ATOMIZATION
Filed Sept. 13, 1957　　　　　　　　　　　　　5 Sheets-Sheet 3

INVENTOR.
ELDON L. ARMSTRONG
WILLIAM R. MARSHALL, JR.,
BY GEORGE W. MURRAY, JR,
HENRY RAICH.

AGENT

Aug. 23, 1960   E. L. ARMSTRONG ET AL   2,950,249
GREASE-MAKING PROCESS INVOLVING MECHANICAL ATOMIZATION
Filed Sept. 13, 1957   5 Sheets-Sheet 5

INVENTORS:
ELDON L. ARMSTRONG,
WILLIAM R. MARSHALL, JR.,
BY GEORGE W. MURRAY, JR,
HENRY RAICH.

Robert D. Lynn
AGENT

United States Patent Office 2,950,249
Patented Aug. 23, 1960

2,950,249

GREASE-MAKING PROCESS INVOLVING MECHANICAL ATOMIZATION

Eldon L. Armstrong, Garden City, N.Y., William R. Marshall, Jr., Madison, Wis., and George W. Murray, Jr., Pleasantville, and Henry Raich, East Meadow, N.Y., assignors to Socony Mobil Oil Company, Inc., a corporation of New York Filed Sept. 13, 1957, Ser. No. 683,815

13 Claims. (Cl. 252—32)

This invention relates to the art of grease manufacture and, more specifically, has to do with a multi-stage mechanical atomization of grease-forming materials to produce a grease.

Armstrong, Butcosk and Murray have described, in application Serial No. 458,158, filed September 24, 1954 (which has been abandoned), and more recently, in continuation-in-part application Serial No. 682,461, filed September 6, 1957, methods for manufacturing grease. The methods are of the following nature. A mixture of an oleaginous vehicle and soap-forming material is constituted. A soap is formed in situ in the vehicle. The resulting vehicle-soap mixture, at a temperature below its solution temperature, is subjected to mechanical atomization into dispersed droplets. The latter are instantaneously contacted directly with a substantially cooler surrounding atmosphere to effect heat exchange thereof. In this way, a grease is formed.

As generally understood, and as pointed out in the latter application, "solution temperature" is that temperature at which substantially complete solution of a soap thickening agent in the liquid lubricant occurs. Thus, it is that temperature at which the soap thickening agent is present as discrete molecules or at most molecular aggregates (crystal nuclei) approximately colloidal dimension in size. As a further expression, it is that temperature at which the Tyndall beam disappears in the mixture.

While each grease is characterized by a solution temperature, it is also often characterized by one or more "transition" temperatures. That is, a soap can exist in different crystalline structures while the soap is in the solid state, insoluble in the oil portion. These crystalline structures differ in degree of crystalline order and degree of interpenetration of oleaginous vehicle with the soap crystalline structure. Each crystalline soap structure is stable over a definite but limited temperature range. Thus, the temperature at which a change occurs in the crystalline structure of the soap portion of a grease, is "a transition temperature." It may also be regarded as a temperature at which a phase change occurs in the grease. Such a temperature is less than the already-defined solution temperature.

While the procedures described in the aforesaid Armstrong et al. applications constitute substantial steps forward in the art of manufacturing greases, it has been found that greater control in producing greases of desired characteristics can be achieved in a related but distinct operation. Thus, greater control over "yield," consistency, mechanical stability, texture and the like, are made possible by the new operation. As understood in the art, "yield" is the amount of grease of a given consistency which may be made with a definite amount of thickening agent. As the yield increases, the percent of thickener decreases. "Consistency," or hardness, refers to the degree to which a plastic material such as lubricating grease resists deformation under the application of force. Thus, it is a characteristic of fluidity. It is usually indicated by either apparent viscosity or ASTM penetration. "Mechanical stability" denotes the resistance to change in consistency when a grease is mechanically worked or sheared; further, it is generally measured by such tests as the Shell Roll Stability Test and the Motor Matic Worker Test. "Texture," as it is commonly referred to in the art, denotes the structural appearance of a grease, for example, smoothness, fibrosity, stringiness, etc.

In addition, in the new operation, it has been possible to effect substantial economies in the preparation of commercial quantities of greases, over prior art procedures including those of Armstrong et al. indicated above. For example, we have found that with a lithium-calcium soap grease, as defined hereinafter, twenty to thirty percent less soap-forming ingredients need be used in the new procedure than in the aforesaid procedures of the Armstrong et al. applications, in order to obtain a grease of comparable consistency and mechanical stability.

The new operation comprises: constituting a mixture of an oleaginous vehicle and soap-forming material; forming a soap in situ in the vehicle, at a temperature above, at or below its solution temperature, such that a minor quantity of water is present therewith; subjecting the resulting vehicle-wet soap mixture, at a temperature below its solution temperature, to mechanical atomization to form dispersed droplets and instantaneously contacting the droplets directly with a surrounding atmosphere, whereupon the vehicle-wet soap mixture is substantially dehydrated; and thereafter subjecting the substantially dehydrated product, at a temperature below its solution temperature, to a more intense mechanical atomization to form dispersed droplets, whereupon homogenization is obtained, and instantaneously contacting the said droplets directly with a substantially cooler surrounding atmosphere to effect heat exchange thereof. All of the oleaginous vehicle can be added initially in constituting the mixture of vehicle and soap-forming material or part only of the vehicle can be so added. In the latter practice, the remainder of the vehicle or vehicles can be added following the dehydration step, or following atomization of the substantially dehydrated product, or portions of the remainder of the vehicle or vehicles can be added after each of these steps. It is to be understood also that an additive or additives can be added at any one or more of such stages of the manufacture.

Accordingly, the primary object of the present invention is to provide an improved grease manufacturing operation whereby the properties of a grease can be controlled more readily during manufacture.

Another object is to provide a grease manufacturing operation whereby imrpoved yield is obtained.

Still other objects are to provide a grease manufacturing operation wherein control of mechanical stability, texture and/or color can be achieved.

Another object of the invention is to provide a rapid grease manufacturing operation.

Another object is to effect economies in grease manufacture.

Still other objects will be apparent from the following description.

In order that the invention can be readily understood, reference is now directed to the drawings which are attached to and form a part of this specification.

In these drawings.

Figure 1:
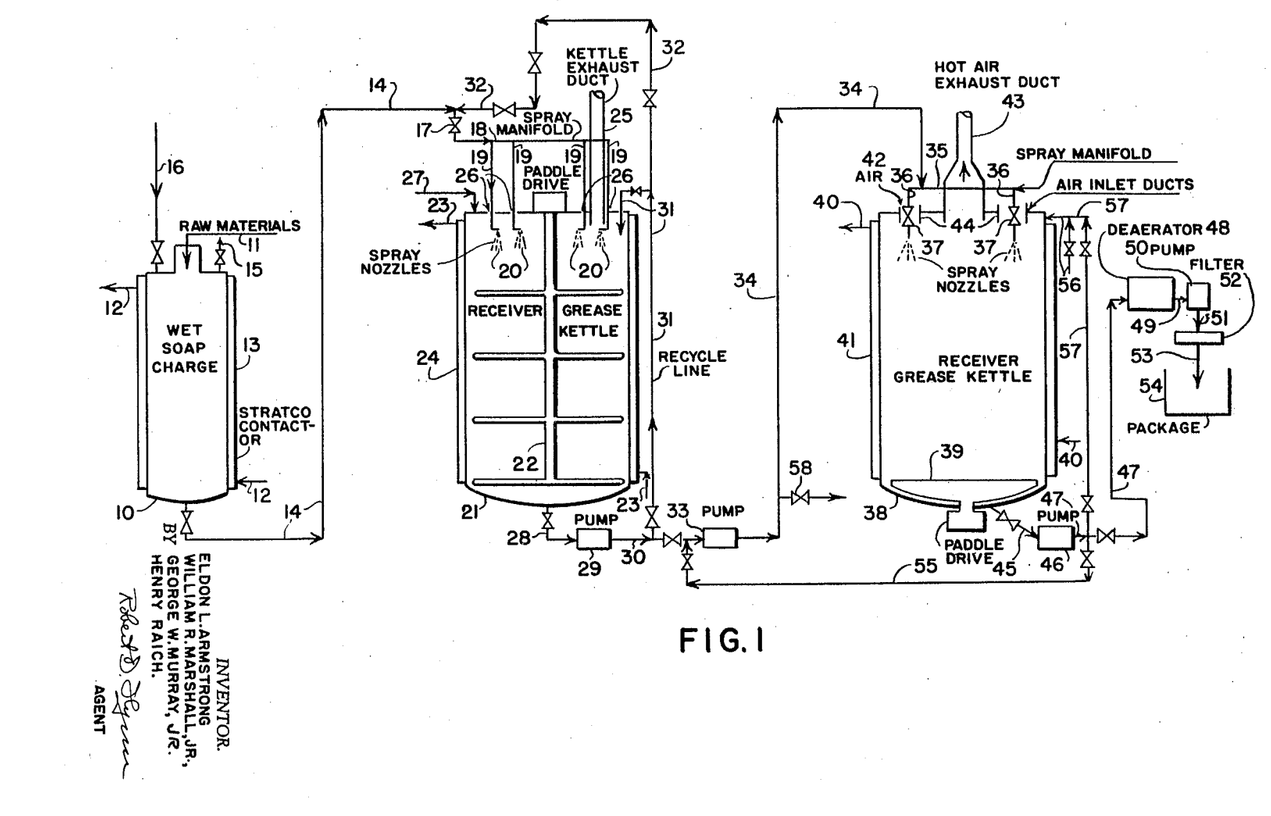
Figure 1 is a highly-diagrammatic form of a typical system for practising the invention.

Referring to Figure 1, 10 is a contactor such as for example the "Stratco contactor," supplied by the Stratford Engineering Company and well known in the art, in which adequate mixing of charge materials accompanies heating. It is to be understood that a pressure kettle, autoclave, etc. can be used in place of a Stratco contactor, but the latter is preferred. Line 11 is a charge line for introducing ingredients to contactor 10. Heat is supplied to 10 by circulating hot oil, stream or the like through line 12 and the jacket 13 thereof. Part or all of the constituents expected to be present in the finished grease are charged through line 11. These constituents will be oleaginous material, such as mineral oil, the thickening agent components, and additives, such as antioxidants and the like. The thickening agent components or soap-forming ingredients, which can be acids including fatty acids and lower molecular weight acids, glycerides and the like, and appropriate metal compounds such as lime flour, sodium hydroxide, lithium hydroxide, and the like, are so added. It is essential that the soap-forming materials so charged provide a minor quantity of water. The water, as determined by Karl Fischer titration, should be at least about 0.25 percent and not more than about 20 percent, and preferably at least about 0.5 perccent or more but not more than about 10 perccent, when the ingredients react to form a soap or soaps in contactor 10; or a quantity of water should be charged through line 11 to provide such an ultimate water content in the mixture taken from the bottom of 10 through discharge line 14. In 10 the ingredients are heated, under a superatmospheric pressure of the order of 100 p.s.i. or at least sufficient to prevent escape of volatile constituents or reaction products, to a temperature and for a time sufficient to ensure completion of any desired reaction, such as neutralization or saponification. This temperature will ordinarily be of the order of 250–400° F., as explained in greater detail hereinafter. However, the temperature of the heated mixture can be maintained at, above or below its solution temperature.

Line 15 is provided at the top of contactor 10, to serve as a vent, should it be desired to control pressure in the contactor or to allow part of the water or other volatile material in the charge to escape.

When reaction of ingredients in 10 is complete, air or other gas is introduced through line 16 under pressure to convey the heated product through line 14 and valve 17 to spray manifold 18, lines 19 and nozzles 20. The gas pressure should be at least sufficient for the atomization required in nozzles 20. Spray manifold 18, for example, can comprise a 2 inch pipe having four ½ inch pipes 19. Each of lines 19 is equipped with a low pressure atomizing nozzle 20. The temperature of the product as it reaches nozzles 20 is below its solution temperature.

The mixture in lines 19 passes through nozzles 20 into receiver 21 such as a typical grease kettle equipped with a motor-driven agitator 22. As shown, the temperature of the material in 21 can be regulated by oil, steam or the like circulating through line 23 and jacket 24. Finely dispersed droplets emerge from nozzles 20 into receiver 21 and are contacted with a surrounding atmosphere in receiver 21. As the material emerges from the nozzles 20, it is substantially dehydrated. In general, a water content of less than about 0.25 percent by weight is desired. This applies to substantially all greases; however, with a few grease types, such as calcium cup greases, the water content should be maintained at a level of about one percent by weight of water in order that structure stability be maintained. The water flashed from the product escapes through duct 25. Part of this water may condense to droplets of liquid water. Air admitted to receiver 21 through inlets 26 surrounding lines 19 sweeps out (through 25) a mixture of water vapor and water droplets.

Receiver 21 should have a capacity of at least about 1½ times the volume of the material delivered from contactor 10 to allow for aeration, in the event the dehydrated product is retained in 21 before being further processed as described hereinafter.

Sufficient air is supplied through inlets 26 surrounding lines 19 carrying nozzles 20 to sweep out water vapor and wet droplets. If dehydration alone is desired in the initial atomization, the quantity of air need not be sufficient to carry off all of the water flashed off as water vapor, since much of the water can be carried off as water droplets. This reduces the air demands for dehydration and also minimizes cooling of the sprayed product. It has been noted that wet product delivered to nozzles 20 is cooled approximately 18° F. for each one percent of water removed by flashing off into water vapor during atomization, because the latent heat of vaporization of the water removed is supplied by the hot product. Further cooling of the sprayed product due to heat transfer of sensible heat to the air used to sweep out water vapor and water droplets, will also occur. Of course, should additional cooling of the sprayed product be desired the quantity of air delivered through inlets 26 can be increased.

In the event a soap concentrate is prepared in 10 with only part of the entire oleaginous vehicle, instead of a mixture with all of the vehicle, all or part of the remainder of the vehicle or vehicles can be added to receiver 21 through line 27. It is to be understood that one or more additives can also be charged, in part or in entirety, through line 27.

The product in receiver 21, maintained below its solution temperature, is removed through valved line 28 by pump 29 and is discharged into valved line 30. If desired, the product can be recycled through valved line 31 for return to receiver 21. This is desirable in order to partially deaerate the product in receiver 21 to reduce its total volume, and/or to aid in mixing the product and any additive or additional vehicle charged through line 27. As shown, the product can also be recycled to nozzles 20 by way of lines 31, 32, 18 and 19. This is advantageous when the water content of the product has not been brought to the desired low value in a single pass through nozzles 20.

Generally, product in line 30 is passed through pump 33, preferably of high pressure positive displacement type, and is discharged therefrom through line 34 to spray manifold 35. The latter (35) is equipped with one or more lines 36 terminating in one or more atomizing nozzles 37. Here too, the temperature of the product in line 28 through to nozzles 37 is so maintained as to be below its solution temperature.

Finely dispersed droplets emerging from nozzles 37 are collected in receiver 38. As shown, receiver 38 is a conventional grease kettle equipped with a motor-driven paddle-type agitator 39. In general, it is preferred that the agitator 39 be activated from the bottom of receiver 38, as shown, rather than of the type represented by agitator 22 in receiver 21; in this way, the top of receiver 38 is left free for better arrangement of atomizing nozzles 37, air inlets and outlet ducts. Temperature of receiver 38 can be regulated, as with receiver 21, by circulating hot oil, steam, etc. through line 40 and jacket 41. Air or other gas is brought into 38 through inlets 42 and leaves through outlet or exhaust duct 43. Air serves as the cooling atmosphere for instantaneous contact with dispersed droplets formed by atomization in order to effect heat exchange by convection. The air also serves to sweep out of receiver 38 any additional wet droplets and water vapor flashed from the atomized product discharged from nozzles 37. Generally, from about 0.5 to about 10 pounds of air are added through inlets 42 per pound of product; preferably, from about 1 to about 4 pounds of air per pound of product are so added. As the product is discharged from nozzles 37 into receiver 38, it is subjected to mechanical atomization into dispersed droplets and the latter are cooled virtually instantaneously by convection heat exchange with the substantially cooler surrounding atmosphere maintained in 38, and particularly the atmosphere immediately adjacent nozzles 37. Some cooling may also be obtained by virtue of the latent heat of vaporization supplied by the material charged to nozzles 37, in vaporizing any additional water and/or other volatile material, released on atomization, since additional dehydration can occur in this atomization.

In receiver 38, it is desired that there be intimate and prolonged mixing of the droplets (from 37) with the air therein. Effective cooling of the product in receiver 38 has been realized by using ducts 44 at air inlets 42, such that incoming air travels down for a substantial distance with the dispersed droplets in a confined volume before it can reach the air exhaust duct 43 entrance. By using such air inlet ducts 44, it is possible to obtain a relatively high velocity of the entering air to achieve more intimate and prolonged mixing of the air with the dispersed droplets from nozzles 37. It is preferable to so place the entrance of exhaust duct 43 to maintain longer contact of incoming air from 44 with the dispersed droplets from nozzles 37 before the air is exhausted from receiver 38. It is also preferable that the entrance of duct 43 be of relatively large cross-sectional area, in order that carry-over of fine droplets of atomized material be minimized or avoided. It is to be understood that design and location of the air flow system, with relation to the location of the nozzles, can be varied considerably with the objective of making efficient use of the incoming air without undue loss of product by carry over of fine droplets.

It is to be understood that other atmospheres than air introduced through inlets 26 and 42, can be used. For example, nitrogen, carbon dioxide, flue gas, steam and the like can be used.

The product collected in receiver 38 has a grease structure and is generally highly aerated. It is removed from 38 through valved line 45 by pump 46, and is passed through pipe 47 to deaeration in deaerator 48. The latter can be any of those usual in the art, such as a Morehouse deaerator, a Cornell code grease homogenizer, a Kinney Heli-Quad vacuum pump, or of the type described by Brooke and Piazza in U.S. Patent No. 2,797,767. These devices generally operate on a vacuum principle. Grease emergent from deaerator 48 through line 49 can be pumped by pump 50 and line 51 through a conventional filter 52. The finished grease is taken through line 53 and is packaged in equipment designated 54.

Grease in line 47 can also be recycled for further atomization in nozzles 37, by return through line 55 to line 30. This is desirable in order to obtain additional homogenization and/or cooling, if such is needed.

Any remaining vehicle or vehicles or additives required can be charged to receiver 38 through valved line 56. As a further modification, grease in line 47 can also be recycled to receiver 38 via valved lines 57 and 56; this is advantageous to aid in mixing vehicle or additive charged through line 56 with product collected in receiver 38. It is also advantageous in removing some of the entrapped air in the product collected in receiver 38 prior to deaeration in 48.

Line 58, in line 34, is provided as a pressure release line for safety purposes.

Figures 2, 3, 4:
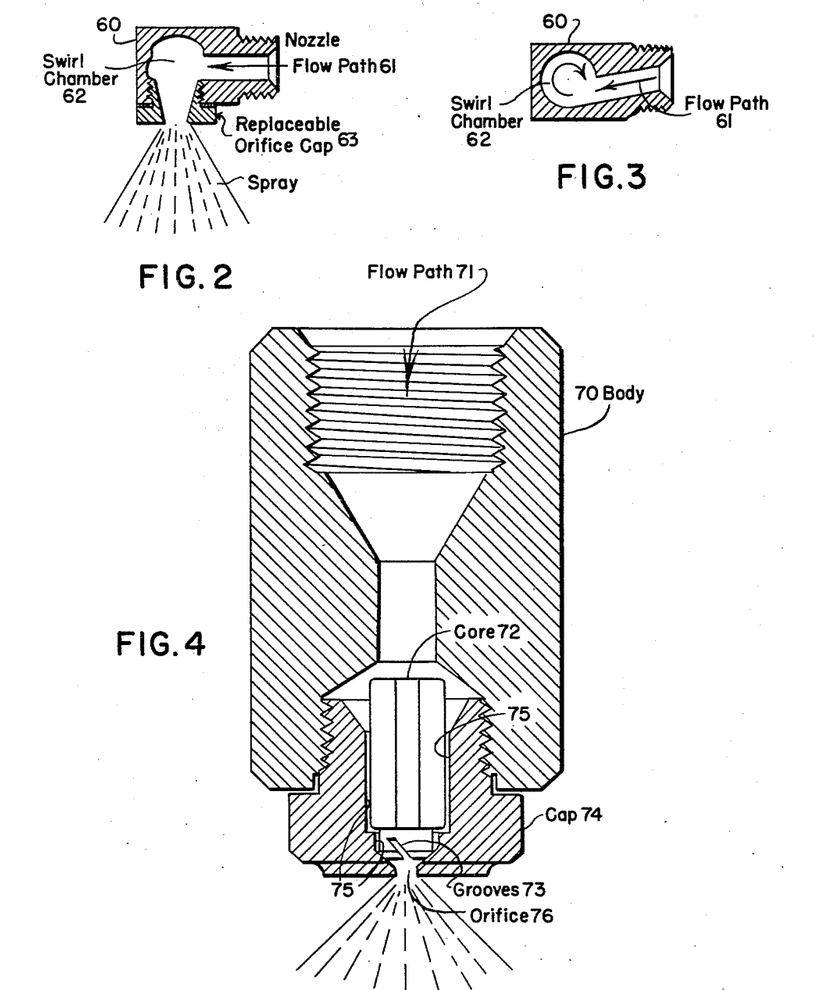
Figures 2 and 3 shows, respectively, a vertical section and a horizontal section of a low pressure atomizing nozzle of a type useful in the practice of the invention.
Figure 4 shows a cross-section of a high pressure atomizing nozzle suitable for use herein.

Figure 2 of the drawings shows, a vertical section, taken along line B—B (see Figure 3), of a typical low pressure atomizing nozzle found useful for the initial mechanical atomization to effect dehydration. The nozzle is composed of a body 60 containing an inlet passage 61, which enters tangentially swirl chamber 62 so that the material passing into chamber 62 has a vortical motion. Here, material swirls around and down, acquiring increasing tangential velocity components. Below the swirl chamber, replaceable orifice cap 63 is secured to body 60 as shown. Material issues from the orifice as a hollow conical sheet which atomizes into a so-called "hollow-cone spray." The diameter of a typical orifice cap 63 useful herein is 0.36 inch. This nozzle is supplied by Spraying Systems Company, as ½ B–40 whirljet nozzle. Throughput characteristics of the nozzle can be regulated by varying the nozzle body size which alters the entrance diameter (of inlet passage 61) and swirl chamber (62) sizes, and by varying the orifice diameter which can be changed independently by substituting orifice caps with different orifice diameters. Varying the feed pressure to the nozzle also varies throughput.

Figure 3 is a horizontal section of nozzle 20, taken along the line A—A (see Figure 2).

Figure 4 reveals, in cross-section, a typical high pressure atomizing nozzle found effective for the second and more intense mechanical atomization to effect homogenization and cooling. This is composed of body 70 containing flow path 71. Toward the end of flow path 71 there is a removable core 72, of hexagonal or square cross-section, and having grooves 73. The core is held in place by orifice cap 74 which is secured to body 70 at shown. As material flows through path 71, it passes along core 72 through annular passage 75 defined by core 72 and cap 74. Material is expelled through orifice 76 of cap 74. The material acquires tangential velocity components in passing through the grooves 73 in core 72. This causes the stream of material to exit from orifice 76 as a hollow cone which atomizes into a hollow-cone spray. In general, the spray emergent from such a nozzle is finer than from the nozzle illustrated by Figures 2 and 3. This fitting of Figure 4 is of heavy construction, being designed for pressures in passage 75 of several thousands of pounds per square inch. The dimensions of one grooved-core nozzle found useful were: orifice diameter, 0.134 inch; a six-grooved core, each groove cross-section being 0.050 by 0.065 inch. Such a nozzle is supplied by Spraying Systems Company, and is identified as ½ SB 30 nozzle, number 40 core.

In place of the atomizing devices illustrated by Figures 2, 3 and 4, other such devices known in the art can be used. For example, the following can be mentioned: impinging jet nozzles, centrifugal or rotating disc atomizers, pneumatic atomizers, vibrating atomizers, multi-jet atomizers, impact type nozzles and other liquid dispersing devices.

Salient features of this invention are described below in connection with several typical, and non-limiting, examples. In this description, the same grease-composition defined in Example 1 was used unless otherwise indicated.

ATOMIZATION CONDITIONS

Example 1

This involves the preparation of a lithium soap grease containing a minor amount of a calcium soap. The grease was prepared from the following materials:

Formula: Weight percent

| | |
|---|---|
| Palmitic acid | 0.49 |
| Stearic acid | 6.30 |
| Oleic acid | 0.21 |
| Lithium hydroxide monohydrate | 0.848 |
| Lime flour | 0.368 |
| Oxidation inhibitor[a] | 0.2 |
| Multipurpose inhibitor[b] | 2.0 |
| Naphthenic mineral oil, 750 secs. S.U.S. at 100° F | 58.23 |
| Naphthenic mineral oil, 135 secs. S.U.S. at 210° F | 31.354 |

[a] This is a mixture of mono and diheptyl diphenylamines.
[b] This is an oil blend containing 1 part (by weight) of oil and one part of a reaction product obtained by reaction of naphthenic acid and diethylene triamine and is described in application Serial No. 683,681, filed September 13, 1957.

Figure 5:
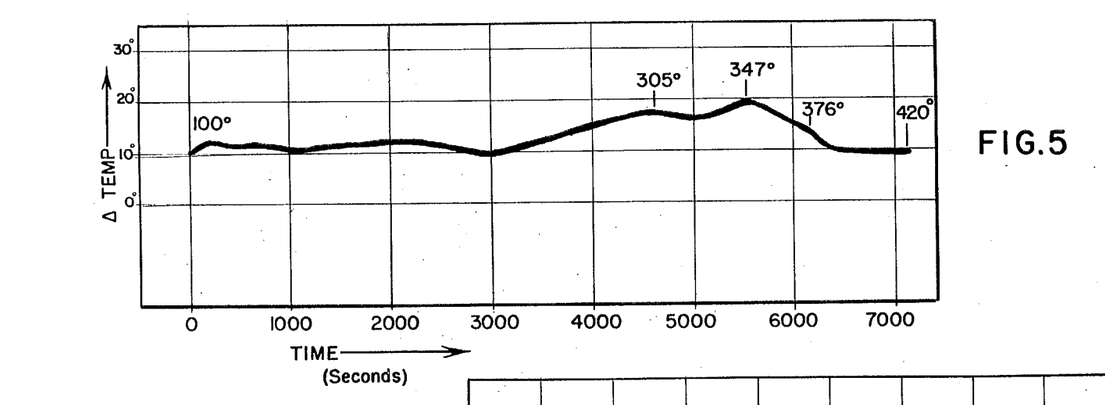
Figures 5 and 6 show typical differential thermal analysis curves of individual greases. Differential thermal analysis is described by D. B. Cox and J. F. McGlynn in Analytical Chemistry, volume 29, pages 960–963, June 1957.

This grease has a solution temperature of about 376° F. The soap portion of the grease can exist in three different crystalline structures while the soap is in the solid state, insoluble in the oil portion. Each crystalline soap structure is stable only over a limited but definite temperature range. On heating from room temperature, the stable soap structure present at the latter temperature persists until the temperature of the grease reaches approximately 305° F. At this temperature, with continued heating the soap changes to a second crystalline structure which persists to about 347° F. Here the soap portion undergoes another change in crystalline structure which is stable up to about 376° F. Above 376° F., the solution temperature, the soap dissolves in the oil. All of this is shown by Figure 5, a differential thermal analysis curve of this grease. The peaks shown in the curve mark the transition temperatures or phase transitions.

Now with regard to preparation of this grease and with reference to Figure 1, all of the ingredients shown were charged through line 11 to a vertical Stratco contactor 10. The ingredients, totalling 10,000 pounds, occupied about 90 percent of the volume of the contactor. It has been found that more advantageous operation often results when the charge to contactor volume ratio is high. The Stratco was heated with circulating hot oil. Throughout the preparation, the temperature of the hot oil entering the Stratco jacket was maintained between 280° F.–295° F. At the time charging of the Stratco had been completed, the temperature of the mixture of ingredients was about 160° F. The ingredients were heated to about 270° F. in about 75 minutes. The ingredients were maintained at 270–280° F. for about 25 minutes until saponification was complete; at this point, the pressure in contactor 10 was about 40 p.s.i. Completion was determined by sampling the material in the contactor and agitating it with a few drops of a phenolphthalein solution. The indicator turned pink (alkaline reaction) when saponification was complete.

The ingredients yielded on saponification a quantity of water, formed by reaction plus water of hydration of the lithium hydroxide monohydrate charged, amounting to about 0.81 percent by weight of the total charge in contactor 10.

With saponification completed, air was introduced to contactor 10 through line 16 at a pressure of 95 pounds per square inch, and this pressure was maintained in the contactor while the contents thereof were discharged. The material in contactor 10 was discharged by the air pressure in the head space in contactor 10, to spray manifold 18 and thence to four nozzles 20. Before entering the nozzles, the temperature of the material was below 280° F. The nozzles were of the type shown by Figures 2 and 3, and each had an orifice diameter of 0.36 inch. The temperature of the material collected in receiver 21 was 264° F. The dispersed droplets of atomized material were contacted instantaneously with a surrounding air atmosphere and were then collected and agitated in grease kettle 21, a 20,000 pound capacity kettle, jacketed, and having rotating paddles. The atomized material had a water content of less than 0.25 percent by weight. Water removed during atomization was exhausted as water vapor and water droplets through duct 25, by sweeping out the same with air admitted to receiver 21 through inlets 26.

Following collection of all of the atomized material in kettle 21, it was discharged by pump 29 through lines 28 and 30 to a high pressure pump 33. It was discharged from the latter at a pressure of 1600–1800 p.s.i. and at a rate of about 10,000 pounds per hour, to line 34 and thence to four nozzles 37. The nozzles were of the type described above in connection with Figure 4. The temperature of the material before passage through nozzles 37 was 244° F. As the material was atomized by nozzles 37 into receiver 38 it was homogenized and cooled. Cooling was effected primarily by contact with air brought into 38 through inlets 42 at a temperature of 85–90° F. and at a rate of about 2.2 pounds of air per pound of material being atomized. Air was removed from 38 through exhaust duct 43. The air temperature in exhaust duct 43 was 153° F. as compared with its inlet temperature of 85–90° F. The dispersed droplets of product from nozzles 37, after collection in receiver 38, were at a temperature of 171° F. following contact with the cooling air.

The grease collected in 38 was then deaerated and filtered as described above. It had the following physical properties:

PHYSICAL PROPERTIES OF FINISHED GREASE

| | |
|---|---|
| ASTM penetration: | |
| Unworked | 282 |
| Worked, 60X, ¼" holes | 287 |
| Worked, 10,000X, ¼" holes | 324 |
| Rolling stability—2 hours: | |
| Micro penetration, initial | 105 |
| Micro penetration, final | 155 |
| Texture | Smooth |
| Wheel bearing leakage, 90 gram pack, grams | 1.5 |
| Water content, percent (Karl Fischer method) | 0.10 |

Penetration values shown above were obtained in accordance with ASTM Method D 217–48 "Cone Penetration of Lubricating Grease." The values for "Rolling Stability" were determined by the procedure described by McFarlane in The Institute Spokesman, volume VI, No. 12, March 1, 1943. The wheel bearing leakage value was determined by the test method described in ASTM D 1263–53T.

The physical properties tabulated are those of a satisfactory grease.

Example 2

This example involves the preparation of lithium soap greases having the composition described in Example 1. In this example, however, the effect of operating conditions in the initial atomization is demonstrated.

Referring to Example 1 and the product taken from contactor 10 through line 14 to nozzles 20, it has been found that this wet saponified product can be broken down by excessive shear during atomization. In order to dehydrate this material, suitable atomization conditions must be maintained. Excessively fine atomization in dehydrating the wet material leads to a product which at this thickener content is soft (low yield) and has less mechanical stability. Correspondingly, too coarse atomization leads to incomplete dehydration of the wet material, which again leads to a product which is soft (low yield) and has less mechanical stability. Thus, the initial atomization should be effected under conditions sufficient to effect proper dehydration and yet not so severe as to produce excessive breakdown of the product.

Efficiency of dehydration and breakdown of the wet saponified product are affected in opposite directions by varying the shear rate in spray nozzles. Efficiency of dehydration increases rapidly with increasing shear rate (conseqently finer atomization) in the nozzles. Increasing shear rate during atomization also increases the extent of breakdown of the atomized product. As a result, it is possible to select nozzles and atomizing conditions which give a proper balance of desired results, including dehydration, mechanical stability and yield. This is illustrated by Figure 7. Data on which Figure 7 is based was obtained by using a pintle valve nozzle (shown by Figures 8, 9, and 10, described below) in which average shear rates could be estimated. Batches of this grease having the same formulation as in Example 1, were saponified under the same conditions as detailed below:

| | |
|---|---|
| Charge, total weight, pounds | 100 |
| Charge saponification temperature, °F. | 288–298 |
| Stratco hot oil temperature, °F. | 285–295 |
| Saponification total time, minutes | 41–53 |
| Water content of charge before atomization, percent wt. | 0.81 |
| Air pressure applied to Stratco before charge is atomized, p.s.i. | 100–110 |

Each batch was spray dehydrated at 100–100 p.s.i through this pintle valve nozzle. The clearance in the orifice of the nozzle (consequently the shear rate) was varied for each batch. After spray dehydration each batch was spray cooled and homogenized by atomizing through a high pressure nozzle of the type shown by Figure 4, the same nozzle and pressure being used for each batch. Each batch was then deaerated. Each batch was sampled during the various stages of the process.

Figure 7 shows the ASTM penetration of the finished deaerated grease to be a minimum (maximum yield) at a shear rate during the initial atomization of about 35,000 second$^{-1}$. Similarly, the rolling stability both immediately after spray dehydration and after finishing, is a maximum (minimum micropenetration after rolling) at about the same shear rate. The data show that the properties of finished grease can be controlled by proper selection of the atomizing conditions during the initial atomization. For example, the data indicate the need for a shear rate of at least about 20,000 and not greater than about 80,000 reciprocal seconds in the initial atomization to produce this grease having optimum balance of yield and mechanical stability. Maximum yield and mechanical stability are realized with shear rates from about 30,000 to about 50,000 reciprocal seconds in the initial atomization for this particular grease formulation.

The pintle valve mentioned above in connection with Figure 7 is shown in Figures 8, 9 and 10. Figure 8 is vertical section of the pintle valve, taken along line A—A (see Figure 9). This valve is composed of body 80, having a flow inlet 81, and to this body 80 is attached a chamber piece 82, having at its outer end an orifice 83. The upper end of chamber piece 82 has a cross member 84 in which there is a threaded passage 85. Threaded pintle 86 screws into this passage 85, so that its conical end 87 may be adjusted with respect to orifice 83 to give a spray orifice of desired character and give rise to a spray having generally the characteristics of a hollow cone, but without tangential velocity components. Gasket 88 is provided between chamber piece 82 and body 80.

Figure 9 is a horizontal cross-section, taken along the line B—B, of the nozzle shown in Figure 8.

Figure 10 shows the dimensions in the orifice region of a particular pintle valve nozzle suitable for investigating shear rate effects. Shear rates obtained with this pintle valve nozzle were estimated in the following way. Maximum shear was assumed to occur in the annular orifice 83. Therefore, the shear rate was defined as the average velocity in the annular orifice divided by the average width of the annulus. The distance *l* was made sufficiently short such that the velocity variation in the annulus was small. The velocity was estimated from the flow rate and orifice area, and the annulus width was determined from the angle of the orifice wall, the length *l*, and the position of the pintle valve which was adjusted by means of carefully machined threads. The area of the annulus was calculated from the geometry of the nozzle and the position of the pintle valve.

Atomizing devices found suitable for the initial atomization also include a nozzle of the type shown by Figures 2 and 3 wherein the orifice diameter was 0.36 inch and the wet saponified product fed to the nozzle was under a pressure of about 100 p.s.i. For a grease composition whose wet soap following saponification is susceptible to substantial breakdown when sheared excessively, the properties of the final composition can be controlled by the shear rates employed in the atomizing devices of the initial and subsequent atomizations. In the initial atomization of a lithium-calcium grease of the type shown here, the shear rate will be within a range corresponding to the range of about 20,000 to about 80,000, and preferably about 30,000 to about 50,000 reciprocal seconds as determined by operation of the pintle nozzle described above. In other types of atomizing devices employed in the first atomization, such as nozzles shown in Figures 2 and 3, the device design and operating conditions are such as to result in shear on passage of the wet soap mixture therethrough as to correspond to the above-mentioned shear rate ranges defined with the pintle nozzle. In any event, the atomization in the second or subsequent atomization of such greases is more intense than that employed in the initial or prior atomization.

SECOND-STAGE ATOMIZATION

*Example 3*

This example reveals the effect of operating conditions in the subsequent atomization. Again, the grease was that described in Example 1.

In this example operating conditions during saponification and the first atomization stage were the same. The nozzle used had an orifice diameter of 0.36 inch, and the pressure was 100 p.s.i. Two 100 pound batches were prepared. Batch A was subsequently atomized at a pressure of 150 p.s.i. through a low pressure spray nozzle of the type shown in Figures 2 and 3, having an orifice diameter of 0.22 inch. Batch B was subsequently atomized at a pressure of 1800 p.s.i. through a high pressure spray nozzle of the type shown in Figure 4, having a core containing four grooves, each groove 0.020 by 0.35 inch in cross-section and an orifice with a diameter of 0.051 inch. Both batches were sampled after the second stage atomization, during which cooling and homogenization were obtained.

The ASTM unworked penetration of batch A was 315, and of batch B was 276. This difference is an indication of the leakage which might be encountered in lubricating ball bearings of vertical motors. Batch A with a value of 315 would have poor sealing properties; whereas, batch B with a value of 276 would stay in place.

Atomization by spray nozzles in the second-stage atomization is an effective means of homogenizing grease. Homogenization occurs during atomization because the grease is sheared during flow through the nozzle. A further source of shear is the mechanical disintegration of the conical sheet of grease issuing from the nozzle into droplets. These two effects cannot be separated readily, but most probably the principal effect is shear during flow in the nozzle. High pressure atomization is more effective for homogenizing than low pressure atomization in the second stage, probably because the velocities (and consequently the shear rates) in high pressure nozzles are much higher.

TEMPERATURE

The temperature reached during saponification is an important factor affecting the subsequent processing required to produce a finished grease. The saponification temperature determines the phase of the soap thickener after saponification is completed. This, in turn, determines the processing required after dehydration of the wet soap to permit the soap to go through necessary phase transitions, if any, before reaching its phase structure stable at room temperature (about 70° F.).

Transition temperatures of the grease defined in Example 1 have been described above. It has been noted that transition temperatures are only slightly affected by soap concentration in the ranges of soap content normally used in grease manufacture, that is, 3 to 50 percent by weight.

The transition temperatures reported above were obtained by slow heating. However, if the grease were cooled from above 376° F. where the soap is soluble in the oil, the phase transitions found would generally occur at lower temperatures than those found on heating. This is due to supercooling. The amount of supercooling can be very large, more than 50° F. for some phase transitions, depending on the cooling rate and degree of agitation during cooling. Supercooling is minimized by slow cooling and rapid agitation.

Grease manufacture is concerned with the existence and rates of phase transitions because soap base greases are conventionally prepared at high temperatures, usually above the solution temperature. Subsequent processing then involves slow, controlled cooling and working in kettles. During the cooling and working cycles the soap crystallizes out of the oil and undergoes the various phase transitions, if any, characteristic of the system before reaching the soap structure stable at room temperature. Careful control of the cooling cycle is needed to insure minimum supercooling and maximum completion of the phase transitions as well as growth of the desired fibre structure of the soap in the oil.

Knowledge of phase transitions is important in applying atomizing techniques to grease-making, primarily because of the speed of cooling obtainable by atomization. Consider the subsequent atomization stage in which cooling and homogenization result. The soap thickener in the product being fed to the atomizing device should be in the desired phase stable at room temperature for maximum yield and mechanical stability to be obtained. This is necessary in the second stage because the product passing through the atomizing device is first homogenized by shearing in the atomizing device and then the dispersed droplets are virtually instantaneously cooled through a substantial temperature drop when atomized into a cooler air stream. If the soap thickener were in a phase not stable at room temperature when fed to the atomizing device, this phase structure would be highly supercooled and subsequent transition to the phase stable at room temperature would occur only partially, if at all, depending on the rate of transition between these two phases.

It is advisable to consider not only the temperature of the mass being processed but also the temperature of the heating medium 12. For example, in a Stratco contactor heated by a hot oil circulating through the jacket 13 thereof, it is advantageous to control the temperature of the oil lest the temperature greatly exceed the temperature desired for the grease mass within the contactor. In conventional practice, the heating medium (hot oil or fluid) in the contactor jacket is maintained considerably higher in temperature than the bulk temperature of the reactants in order to obtain as large a temperature differential as practical so that reasonable heat transfer rates are realized. Since the reactant mixture is a relatively good thermal insulator, in conventional practice the film temperature of the mixture in contact with the heat transfer surface is considerably hotter than the bulk of the mixture. This hot film is continuously being worked back into the mass by vigorous agitation in the contactor and cooled by the mass. The hot film is replaced by cooler material from the mass. Under conditions where the heating medium is well above a transition temperature and the bulk of the mixture is below it, the film temperature of the mixture in contact with the heat transfer surface can exceed its corresponding transition temperature. The soap in the film will then undergo a phase transition to a phase stable at the corresponding higher temperature of the film and will then be mixed back into the cooler bulk material. If the material previously in the film is sufficiently supercooled when mixed back into the mass, or if the rate of phase transition back to the phase stable at the lower temperature of the mass is slow, the soap in this portion of material previously in the film will remain at least partially in the higher temperature phase. It is, therefore, possible, under normal processing conditions, to transform part of the soap in the mass being heated into a phase which is supercooled and unstable at the temperature of the mass.

Example 4

This example is provided to demonstrate that the properties of greases obtained in the present invention can be controlled by proper regulation of operating temperatures. Again, the grease defined in terms of its composition in Example 1 was used.

In batch A, the saponification temperature and the temperature of the Stratco heating medium were below the lowest transition temperature of 305° F. Batch B was prepared under conditions such that the bulk of the saponification mixture in the contactor was below this transition temperature (305° F.), and the heating medium was substantially above such temperature. The operating conditions and the physical properties of the grease products obtained in each preparation are tabulated below:

|  | A | B |
|---|---|---|
| Saponification Conditions: |  |  |
| Charge Weight in Pounds | 100 | 100 |
| Bulk Temperature of Saponification Mixture, °F | 298 | 296 |
| Heating Medium Temperature, °F | 290-300 | 390-350 |
| Dehydration Conditions: |  |  |
| Pressure at Nozzle, p.s.i. (Figs. 2-3) | 102 | 105 |
| Temperature after Atomization, °F | <300 | <300 |
| Second Stage Atomization: |  |  |
| Temperature before Atomization, °F | 261 | 265 |
| Pressure at Nozzle, p.s.i. (Figs. 2-3) | 150 | 150 |
| Temperature after Atomization | 190 | 170 |
| Properties of Deaerated Products: |  |  |
| ASTM Penetration— |  |  |
| Unworked | 290 | 345 |
| Worked, 60X, ¼" Holes | 304 | 363 |
| Worked, 10,000X, ¼" Holes | 341 |  |
| Rolling Stability, 2 Hours— |  |  |
| Micro Penetration, Initial | 112 | 158 |
| Micro Penetration, Final | 174 | 282 |

Batch B illustrates the influence of film temperature discussed above. While the bulk temperature during the saponification remained below 305° F., the heating medium temperature was such that film temperature during saponification exceeded 305° F. The product of batch B shows lower yield and lower mechanical stability than did the product of batch A, where both the bulk temperature and the heating medium temperature remained below 305° F.

It is to be understood that the greases of batches A and B are satisfactory products, though they differ in their final characteristics, and though batch A has the better yield and mechanical stability of the two products. Thus, the control of temperature provides a means for controlling the properties desired in a grease product.

Example 5

The importance of control of film temperature during processing subsequent to saponification and the initial atomization step is illustrated by the following data. This batch was prepared under the same conditions and with the same quantities as those used in Example 1. The bulk temperature and heating medium temperature during saponification, and the atomization temperatures, were all below 305° F. A small portion of the batch in receiver 38 at a temperature of 130° F. was deaerated. The bulk temperature of the remainder in receiver 38 was then heated to 180° F. by passing steam at 100 p.s.i. (about 335° F.) through the jacket 41 of receiver 38. This material was then deaerated. Properties of the portion deaerated at 130° F. and of the portion after heating to 180° F. are shown below:

|  | Deaerated at 130° F. | Deaerated After Heating to 180° F. |
|---|---|---|
| ASTM Penetration: |  |  |
| Unworked | 280 | 325 |
| Worked, 60X, ¼" Holes | 290 | 325 |
| Worked, 10,000X, ¼" Holes | 337 | 365 |
| Rolling Stability, 2 Hours: |  |  |
| Micro Penetration, Initial | 105 | 138 |
| Micro Penetration, Final | 157 | 190 |

In this preparation, as in Example 1, above, receiver 38 was a 20,000 pound capacity kettle, jacketed, and having rotating paddles but no scrapers. With such a receiver, the film temperature is substantially the same as the temperature of the heating medium in the receiver jacket. The film temperature, then, exceeded the lower transition temperature of 305° F., although the bulk temperature did not exceed 180° F. The effects of exceeding the transition temperature are evident from the tabulation given above. That is, the yield of the product was reduced by exceeding the transition temperature in the film.

*Example 6*

An additional example of the preparation of the lithium-calcium grease of Example 1 is set forth below.

| Formula: | Pounds |
|---|---|
| Palmitic acid | 0.53 |
| Stearic acid | 6.75 |
| Oleic acid | 0.22 |
| Lithium hydroxide monohydrate | 0.908 |
| Lime flour | 0.395 |
| Oxidation inhibitor a | 0.2 |
| Naphthenic mineral oil, 750 secs. S.U.S. at 100° F. | 90.997 |
| Water | 1.0 |

The ingredients were charged to a Stratco contactor. Saponification was carried out up to a temperature of 292° F. Pressure in the contactor was 51 p.s.i. The saponification mixture was then atomized through a nozzle of the type shown by Figures 2 and 3, the nozzle having an orifice diameter of 0.22 inch. Approximately 70 pounds of the saponification mixture was atomized. The contactor was vented and then the balance of the mixture was atomized. The atomized material was collected in a kettle. The temperature of the material so collected was 268° F. The collected material was then atomized at a pressure of 600–1300 p.s.i. through a nozzle of the type shown by Figure 4. The temperature of the material entering the latter nozzle was 223° F. The product collected after the second atomization was deaerated in a Cornell cold grease homogenizer. Physical properties of the grease so prepared are tabulated below:

| ASTM penetration: |  |
|---|---|
| Unworked | 333 |
| Worked, 60X, ¼" holes | 335 |
| Worked, 5000X, ¼" holes | 378 |
| Rolling stability—2 hours: |  |
| Micro penetration, initial | 140 |
| Micro penetration, final | 282 |

A grease of another type and the preparation thereof is shown in the following illustrative example.

*Example 7*

A lithium hydroxystearate grease was prepared in the following manner.

Figure 6:
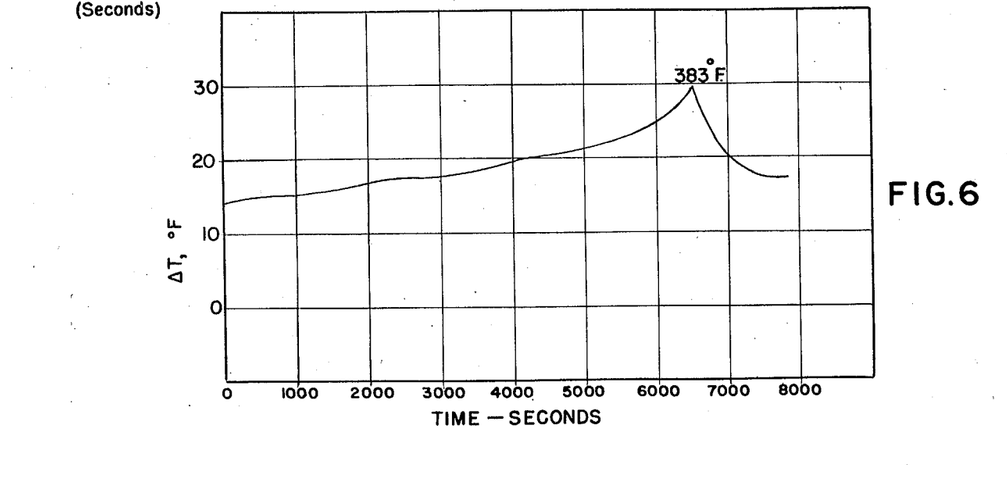
Figure 7:
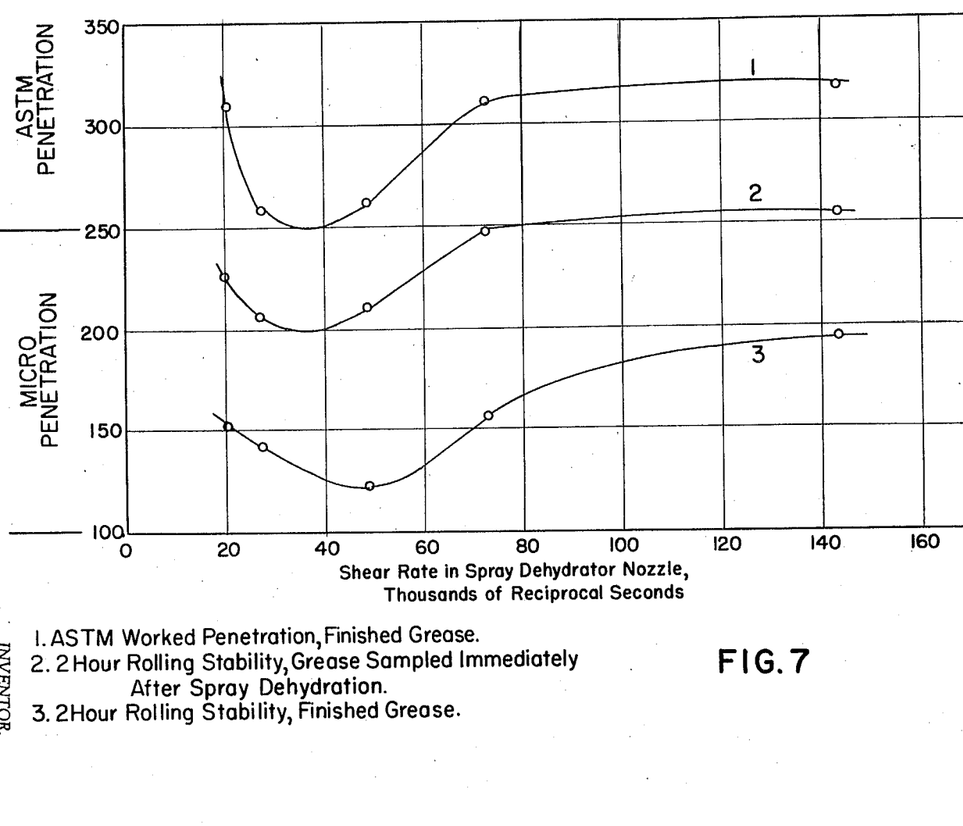
Figure 7 shows the effect of shear rate in the initial mechanical atomization operation upon certain representative characteristics of an individual grease, a lithium soap grease containing a minor proportion of calcium soap.
Figure 8:
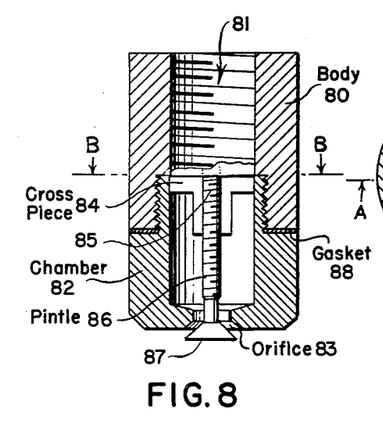
Figures 8 and 9 show, respectively, a vertical and a horizontal cross-section of a pintle valve, pressure atomizing nozzle useful in investigating the effects of shear rate on a grease in the dehydration-atomization step.
Figure 9:
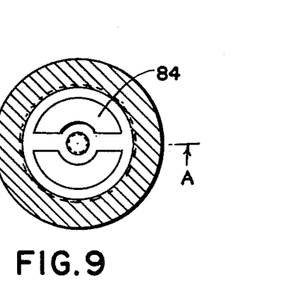
Figure 10:
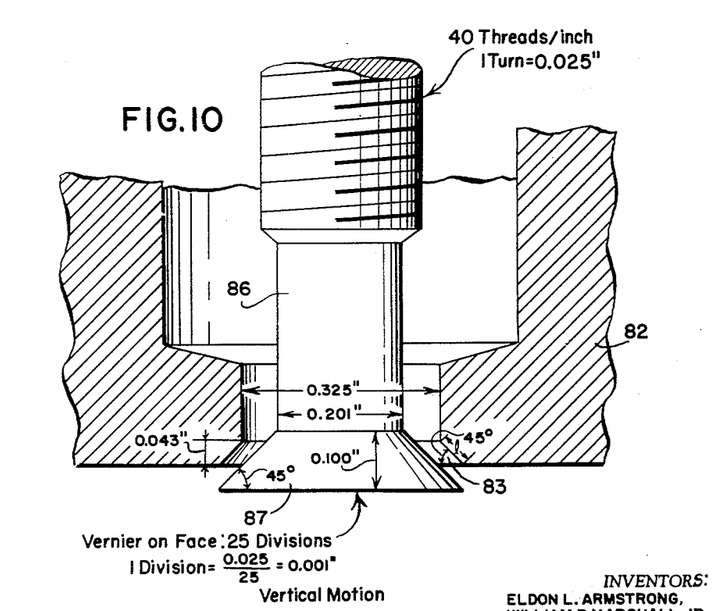
Figure 10 indicates the dimensions in the orifice region of a particular pintle valve, pressure atomizing nozzle used for the above purpose.

The soap-forming ingredients, fatty acids and lithium hydroxide, and about 37 percent of the total mineral oil used, were charged to a 100 pound capacity Stratco contactor. The batch was heated to 360° F. over a period of 1¼ hours. The solution temperature of a grease of the composition shown below is about 383° F. as indicated in Figure 6; it has no phase transition between 70° F. and the solution temperature. After saponification was complete, the contents of the contactor were atomized through a nozzle of the type shown in Figures 2 and 3, having an orifice diameter of 0.29 inch. The water content before atomization was 2.1 percent, and after was 0.20 percent (Karl Fischer method). The substantially dehydrated product was collected in a kettle, and the balance of mineral oil was added thereto at a temperature of about 300° F. The resulting product was then atomized more intensely through a nozzle of the type revealed by Figure 4 having a core with four grooves, each groove being 0.020 by 0.035 inch in cross-section, and having an orifice with a diameter of 0.051 inch. The pressure at the nozzle was 900–1200 p.s.i. The atomized product was cooled to 135° F. and was deaerated. The resulting grease had the properties shown in the following tabulation:

| Composition: | Weight percent |
|---|---|
| Hydrogenated soya fatty acids | 1.4 |
| Hydrogenated caster oil acids | 5.4 |
| LiOH.H₂O | 1.1 |
| Antioxidant a | 0.2 |
| Naphthenic mineral oil, 750 secs. SUS at 100° F. | 91.9 |

| Properties of finished grease: |  |
|---|---|
| ASTM penetration— |  |
| Unworked | 258 |
| Worked, 60X, ¼" holes | 252 |
| Worked, 60,000X, ¹⁄₁₆" holes | 326 |
| Rolling stability, 2 hours— |  |
| Micro penetration, initial | 92 |
| Micro penetration, final | 96 |

This was a satisfactory grease.

It is to be noted that Example 7 involves the preparation of a soap concentrate in the saponification and initial atomization operations. In this example about 37 percent of the total mineral oil was in the original charge; in general, this can fall within the range of from about thirty to about forty percent by weight of the total mineral oil in the grease. Thereafter, the formulation was completed by addition of the remaining oil vehicle, and the resulting product was then subjected to the more intense atomization to simultaneously effect cooling and homogenization. This procedure can be modified by processing a soap concentrate through both atomization stages and then adding any remaining vehicle required prior to deaeration. As a further modification, part of the vehicle can be present in the saponification, another part can be added following the initial atomization, and the remaining part can later be added following the more severe atomization and prior to deaeration. Similarly, additives can be introduced at any of the stages indicated in this discussion.

FURTHER MODIFICATIONS

As a further modification, with a grease having one or more phase transitions occurring between room temperature (about 70° F.) and solution temperature, a soap concentrate can be constituted in the saponification step and saponification can be effected at a temperature intermediate between the solution temperature and the lowest transition temperature. This concentrate can be atomized at such an intermediate temperature to obtain substantially complete dehydration. The dehydrated product can then be cooled through a controlled cooling cycle in a holding vessel, which can be receiver 21. The controlled cooling cycle would reduce the temperature of the dehydrated soap concentrate below the lowest transition temperature, and the time and conditions of such cooling would be sufficient to effect substantial transition of the soap thickener to the phase stable at room temperature. Part or all of the remaining vehicle can be added during or following this cooling cycle. The resulting product can then be atomized under more intense conditions at a temperature below the said lowest transition temperature. Any remaining vehicle can be added following the latter atomization prior to deaeration. Similarly, additives can be introduced at any of such stages.

Still another modification comprises preparation of a grease by using all of the ingredients in the saponification mixture, with the saponification temperature being intermediate between the solution temperature and the lowest transition temperature. The wet saponification mixture can be atomized in the initial operation at such an intermediate temperature, and the resulting substantially dehydrated product can be cooled through a controlled cooling cycle as described above. The product, cooled below the lowest transition temperature and the soap thickener substantially in the phase stable at room temperature, can be atomized under more intense conditions to effect further cooling and homogenization. Again, additives can be added at any stage of the preparation.

Although the invention has been illustrated hereinabove by mineral oil vehicles, it is to be understood that other lubricant vehicles can also be used in this new manufacturing technique. In the saponification step, it is necessary that the vehicle there used be stable at the operating temperatures and be resistant to saponification and hydrolysis. Typical of such vehicles are mineral oils, polymerized olefins, silicones, fluorocarbons, perfluoroalkyl ethers, etc. After the initial atomization step, these and other vehicles can be added, since it is no longer necessary that the vehicle be resistant to the saponification environment. This is primarily a dilution stage. Such other vehicles are typified by esters of various dibasic acids, esters of polyalcohols and monocarboxylic acids, silicate esters, esters of phosphorus-containing acids, amines, etc. Typical vehicles are: polypropylene, polypropylene glycol, di-(2-ethyl hexyl) sebacate, di-(2-ethyl hexyl) adipate, dibutyl phthalate, polyethylene glycol di-(2-ethyl hexoate), polymethylsiloxane. The synthetic vehicles are most suitable for providing greases for use in aircraft, since many of these greases retain their lubricating value over a wide temperature range, from about −100° F. to about 500° F. In general, the mineral oils and synthetic lubricants which can be used herein are characterized by a viscosity (S.U.V.) of greater than about 40 seconds at 100° F., preferably from about 60 to about 6,000 seconds at 100° F.

While the nature of this invention has been described in considerable detail and various illustrations have been given for improved procedures for the preparation of specific grease compositions, it is to be understood that the invention in its broader aspects is not limited thereto but includes numerous modifications and variations of multistage mechanical atomization of grease mixtures as set forth in the appended claims.

We claim:

1. The method of making a grease, which comprises: constituting a mixture comprising a lubricant vehicle, a saponifying agent and a fatty material selected from the group consisting of a fatty acid and a glyceride, said mixture having a water content from about 0.25 to about 20 percent by weight during soap formation; forming a soap thickening agent in situ in the vehicle and cooling the resultant mixture to a temperature below its solution temperature when the soap thickening agent is formed at a temperature above the solution temperature; subjecting the resulting vehicle-wet soap mixture, at a temperature above about 250° F. and below its solution temperature, to mechanical atomization to form dispersed droplets and instantaneously contacting the droplets directly with a surrounding atmosphere, whereupon the vehicle-wet soap mixture is substantially dehydrated; and subjecting the substantially dehydrated product, at a temperature above about 220° F. and below its solution temperature, to a more intense mechanical atomization to form dispersed droplets and instantaneously contacting the droplets directly with a substantially cooler surrounding atmosphere to effect heat exchange thereof.

2. The method of making a grease, which comprises: constituting a mixture comprising a lubricant vehicle, a saponifying agent and a fatty material selected from the group consisting of a fatty acid and a glyceride, said mixture having a water content of from about 0.25 to about 20 percent by weight during soap formation; forming a soap thickening agent in situ in the vehicle and cooling the resultant mixture to a temperature below its solution temperature when the soap thickening agent is formed at a temperature above the solution temperature; subjecting the resulting vehicle-wet soap mixture, at a temperature above about 250° F. and below its solution temperature, to mechanical atomization to form dispersed droplets and instantaneously contacting the droplets directly with a surrounding atmosphere, whereupon said resulting mixture is substantially dehydrated to a water content of less than about 0.25 percent by weight; and subjecting the substantially dehydrated product, at a temperature above about 220° F. and below its solution temperature, to a more intense mechanical atomization to form dispersed droplets and instantaneously contacting the latter droplets directly with a substantially cooler surrounding atmosphere to effect heat exchange thereof.

3. The method of claim 2 wherein the soap thickening agent is formed at a temperature below its solution temperature.

4. The method of claim 2 wherein the temperature is always below the initial transition temperature of the said soap thickening agent in the vehicle.

5. The method of claim 2 wherein the temperature of the vehicle-wet soap mixture and the temperature of the dehydrated product subjected to mechanical atomization are below the initial transition temperature of the soap thickening agent in the vehicle.

6. The method of claim 2 wherein the lubricant vehicle is mineral oil.

7. The method of claim 2 wherein a mixture of soaps are formed in situ in the vehicle.

8. The method of claim 2 wherein the original mixture has a water content of from about 0.5 to about 10 percent by weight, and wherein said mixture is dehydrated to a water content of less than about 0.5 percent by weight.

9. The method of claim 2 wherein mechanical atomization is accomplished by spraying said vehicle-wet soap mixture through a low pressure atomizing nozzle, and by spraying said substantially dehydrated product through a high pressure atomizing nozzle.

10. The method of making a lithium soap grease containing a lesser quantity of calcium soap and having a solution temperature of about 376° F., which comprises: constituting a mixture of mineral oil, lithium hydroxide, lime and fatty material, said mixture having a water content of about one percent by weight during saponification; forming a mixture of lithium and calcium soaps by saponification in situ in the mineral oil at a temperature below about 376° F.; subjecting the resulting mineral oil-wet soaps mixture, at a temperature above about 250° F. and below about 376° F., to mechanical atomization to form dispersed droplets and instantaneously contacting the droplets with a surrounding atmosphere, whereupon said resulting mixture is substantially dehydrated to a water content of less than about 0.25 percent by weight; subjecting the substantially dehydrated product, at a temperature above about 220° F. and below about 376° F., to a more intense mechanical atomization to form dispersed droplets and instantaneously contacting the latter droplets with a substantially cooler surrounding atmosphere of air to effect heat exchange thereof.

11. The method of making a lithium soap grease containing a lesser quantity of calcium soap and having a solution temperature of about 376° F., which comprises: constituting a mixture of mineral oil, lithium hydroxide, lime and fatty material, said mixture having a water content of about one percent by weight during saponification and containing from about thirty to about forty percent by weight of the total mineral oil in the grease; forming a mixture of lithium and calcium soaps by saponification in situ in the mineral oil at a temperature (1) between about 310° F. and about 376° F.; adding the remainder of mineral oil; subjecting the resulting mineral oil-wet soaps mixture, at a temperature (2) between about 310° F. and about 376° F., to mechanical atomization to form dispersed droplets and instantaneously contacting the droplets with a surrounding atmosphere, whereupon said resulting mixture is substantially dehydrated to a water content of less than about 0.25 percent by weight; subjecting the substantially dehydrated product, at a temperature (3) above about 220° F. and below about 376° F., to a more intense mechanical atomization to form dispersed droplets and instantaneously contacting the latter droplets with a substantially cooler surrounding atmosphere of air to effect heat exchange thereof.

12. The method of claim 11 wherein the initial mechanical atomization is conducted at a shear rate corresponding to a shear rate from about 20,000 to about 100,000 reciprocal seconds as determined in a pintle valve nozzle operated as described herein.

13. The method of forming a lithium hydroxystearate grease having a solution temperature of about 383° F., which comprises: constituting a mixture of mineral oil, lithium hydroxide, hydrogenated soya fatty acids and hydrogenated castor oil acids, said mixture having a water content of about two percent by weight during soap formation and containing about one-third of the total mineral oil in the grease; forming lithium soaps by saponification in situ in the mineral oil, at a temperature below about 383° F.; subjectng the resulting oil-wet soap mixture, at a temperature above about 250° F. and below about 383° F., to mechanical atomization to form dispersed droplets and instantaneously contacting the droplets with a surrounding atmosphere, whereupon said resulting mixture is substantially dehydrated to a water content of about 0.2 percent by weight; adding the balance of the mineral oil to the substantially dehydrated product at a temperature between about 250° F. and about 383° F.; subjecting the substantially dehydrated product, at a temperature above about 220° F. and about 383° F., to a more intense mechanical atomization to form dispersed droplets and instantaneously contacting the latter droplets directly with a substantially cooler surrounding atmosphere to effect heat exchange thereof.

References Cited in the file of this patent

UNITED STATES PATENTS

| | | |
|---|---|---|
| 2,257,945 | Fraser | Oct. 7, 1941 |
| 2,433,636 | Thurman | Dec. 30, 1947 |
| 2,704,363 | Armstrong | Mar. 15, 1955 |

UNITED STATES PATENT OFFICE

CERTIFICATE OF CORRECTION

Patent No. 2,950,249                                      August 23, 1960

Eldon L. Armstrong et al.

It is hereby certified that error appears in the printed specification of the above numbered patent requiring correction and that the said Letters Patent should read as corrected below.

Column 10, line 52, for "0.35" read -- 0.035 --.

Signed and sealed this 4th day of April 1961.

(SEAL)
Attest:    ERNEST W. SWIDER
Attesting Officer                                              ARTHUR W. CROCKER
                                                                    Acting Commissioner of Patents